Feb. 7, 1967  R. G. TUGEN  3,302,263
FORMATION AND MOULDING OF FELT
Filed Jan. 15, 1965

INVENTOR
ROBERT GEORGE TUGEN

Stowell & Stowell
ATTORNEYS 3,302,263
FORMATION AND MOULDING OF FELT
Robert George Tugen, Hawthorn, Victoria, Australia, assignor to Commonwealth Scientific and Industrial Research Organization, East Melbourne, Victoria, Australia
Filed Jan. 15, 1965, Ser. No. 425,757
Claims priority, application Australia, Jan. 28, 1964, 40,199/64
16 Claims. (Cl. 28—5)

This invention relates to the formation and moulding of felt from suitable fibrous material and especially from sheep's wool or mixture thereof with other fibres.

Wool felts are generally produced in the form of flat sheets of substantially uniform thickness, the felting operation being generally commenced and sometimes completed in a machine known as a flat hardener which comprises horizontally arranged upper and lower steam-heated platens. The upper platen is moveable vertically and is weighted so as to subject the material to the requisite pressure, which usually is rather more than one pound per square inch, while also at least one of the platens is arranged to be vibrated or shaken in its own plane so that each point thereof reciprocates in a straight line or moves in a circular or elliptical path without rotation rev. relatively to the other platen.

The felt is usually formed from a wool batt which comprises many layers of carded wool web and which after being moistened with wet steam or water sprays is pressed and rubbed between the relatively moving platens so that the constituent fibres are moved relatively whereby they interlock or felt together to form a self-sustaining sheet which becomes progressively more hard and dense as the operation continues.

An alternative type of felt hardening machine is a roller hardener which comprises upper and lower banks of rollers between which the batt is subjected to pressure and in which the rubbing action is produced by vibrating some of the rollers axially. This type of machine has the advantage that the material moves continuously through it.

While it is possible to produce felt suitable for many purposes by flat hardening or roller hardening alone it is usual to subject the hardened sheets so formed to a subsequent operation known as milling or fulling and which is often regarded as being the real felting process. Milling or fulling is carried out by placing a loose heap of the hardened felt sheets in the bowl of a machine known as a stock and which has a series of wooden hammers or other heavy members which pound the material in order to render it still more dense and strong.

There is a considerable demand particularly for industrial purposes for shaped articles of thick flat felt such as circular discs, rings and the like and such articles are generally stamped from preformed felt sheets of the required thickness formed in a flat hardener. The production of thick sheets in this way is a lengthy operation while also considerable wastage occurs when articles such as circular discs or rings are subsequently stamped or cut from it.

Now the general object of this invention is to provide improved methods of and means for forming felt while one particular object is to provide a method of and means for forming felt articles of various shapes, sizes and thicknesses.

Accordingly the invention includes the method of forming felt including the steps of subjecting a mixture comprising feltable fibres and water or an aqueous solution to movement within a containing vessel or mould whereby the fibres progressively felt together so that the mass thereof contracts and progressively expels liquid from the interior thereof.

More particularly the amount of liquid initially present is preferably such that the fibrous mass is, without being compressed, substantially completely immersed therein so that individual fibres can freely undergo relatively movements. As the felting operation proceeds, the free or excess liquid may be intermittently or continuously removed from the vessel or mould.

Preferably the aforesaid movement of the mixture of water and fibres within the vessel or mould is produced by shaking vibrating, rotating and/or oscillating the latter while also the motions thus imparted may be such as to produce centrifugal or other inertia forces in directions such as to facilitate the felting action and/or the shaping or moulding of the felt.

The shape and size of the felt mass formed within the vessel or mould is influenced, though not necessarily fully determined, by the shape and size of the interior of the vessel or mould as among other things the nature of the shaking motion imparted to the vessel and the duration of this treatment may also influence both its shape and size. However, in general the partly felted mass as removed from the vessel or mould is usually substantially smaller than the interior of the vessel or mould for the reason that as the felting action proceeds the fibrous mass becomes progressively more dense so that it contracts in size both laterally and vertically.

If desired the partly felted and shaped mass may be transferred to a second and smaller vessel or mould in which the felting and forming action is continued and so on with additional moulds of progressively smaller size if required. That is to say the aforesaid operations may be repeated in moulds of progressively smaller size until the felt has acquired the required degree of hardness. In some cases it may be desirable to use perforated vessels or moulds for the second and any later stages of the operation in order to discharge the liquid expelled from the felt during the further hardening of the latter.

If desired one or more core members may be arranged within the vessel or mould to form corresponding openings or cavities in the felt mass and such core members may be fixed to the vessel or they may be freely movable therein in which case they may be relatively heavy whereby due to their inertia they will move relatively to the fibrous mass when the vessel is shaken or vibrated. Thus, for example annular felt articles may be formed in this way while similarly the fibrous material may be simultaneously felted and moulded or formed to a wide variety of articles of different shapes including for example, moulded upholstery pads or units for furniture, motor car seats and the like. Also if desired the felts may be formed on or about one or more cores as above described so that these cores are embedded as inserts in the felt in order to form composite articles formed partly of felt.

The fibrous mass as removed from the vessel or mould may contain a considerable amount of water and may indeed still be quite wet unless the material is subjected to pressure while still in the vessel to expel additional water therefrom. Thus, the fibrous material as shaped in and removed from the vessel or mould is generally in a partly felted condition only and is subsequently subjected to further treatment to expel additional liquid therefrom and to develop and harden the felt and this hardening operation, which may be carried out in a variety of different ways, may further modify and determine the shape and/or size of the felt articles.

While the invention has been devised principally with the object of producing felt articles of special shapes, it is not limited thereto as it is applicable also to, for example, the formation of flat rectangular sheets of felt.

As previously stated herein felt is usually formed from batts of wool which comprises a large number of layers of carded wool web as discharged from the carding machine. The nature of the carding operation is such that the individual fibres tend to be oriented so that they are arranged lengthwise in the thin tenuous web so that if the latter is straight-lapped upon itself to form a batt of the required thickness, the majority of the fibres extend in the lengthwise direction of the batt and felt formed therefrom has appreciably greater strength in the direction of its length than it has in the width-wise direction or in the direction of its thickness. Whilst it is known to lap the web in various different ways in order to produce felt which is more uniform in strength in different directions the orientation of the fibres by the carding machine generally precludes the formation of felt which is substantially uniform in strength in all directions.

In this respect the present invention permits of the production of felt which is more uniform in strength as it does not necessitate the formation of the carded wool web into batts before the felting operation is commenced nor indeed does it necessitate the use of carded webs with oriented fibres as all that is required to form a wool-water pulp which is substantially uniform in density and this may be accomplished in a variety of different ways.

Thus for example the carded web may be fed directly into and distributed within a body of water previously placed in a container e.g. the aforesaid forming vessel or mould or the fibres may be deposited more or less individually and so as to be arranged indiscriminately therein. Again the web may be fed to the container with a more or less circular motion so that a flat coil thereof is formed therein and this is particular advantageous when the felt articles to be formed are of generally cylindrical shape for the reason that the fibres are then oriented principally in the circumferential direction. On the other hand, the fibres in a flat disc or ring stamped from a thick felt sheet formed in the usual way are generally oriented in one particular direction so that the strength of the felt varies considerably around the circumference thereof.

The invention therefore includes the formation of the pulp or wool-water mixture in any of the aforesaid ways, but does not exclude the use of preformed dry batts which if desired may be preshaped to conform to the particular felt articles to be produced. Thus for example batts of required thickness may be formed in the usual way and sheets of paper or other suitable protective material may be adhered to the opposite sides thereof so that flat discs, ring or other shapes may be cut therefrom and, after the protective sheets are removed therefrom, these preshapes may be immersed, the one above the other in the vessel or mould until the required quantity of fibrous material is accumulated therein. It will be apparent that when this procedure is adopted, the successive preshaped batts may be arranged so that fibres therein are differently oriented.

In order that the invention may be more readily understood and put into practice reference will be made to the accompanying drawings in which.

Figure 1:
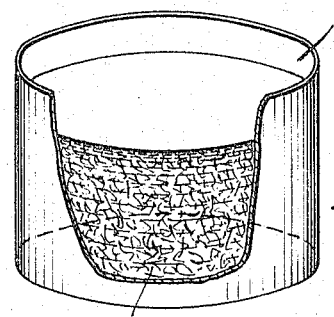
FIGURE 1 shows a substantially circular vessel having therein a wool liquid mixture.
Figure 2:
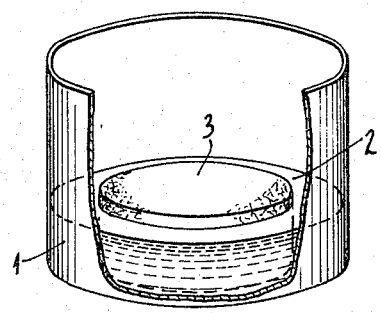
FIGURE 2 is a perspective view of the same vessel after the felting process has been substantially completed.

The vessel illustrated in FIGURES 1 and 2 is used to form a partly felted flat annular disc and this formation will now be described.

The vessel 1 is intially substantially filled with water 2 having a small proportion of a suitable detergent or other wetting agent in solution therein after which wool fibre 3 are progressively supplied to the vessel and immersed in the liquid so as to form a loose uncompressed layer of substantially uniform thickness and density therein. This wool may either be carded, which is the form in which is normally supplied, or alternatively the wool may be in the form simply of free fibres which are completely unoriented. This operation, which may be carried out in any sutiable manner and preferably so that the constituent fibres are indiscriminately arranged is continued until the vessel contains sufficient wool to form the required disc.

At the conclusion of the filling operation the wool thus inserted is preferably disposed wholly below the free surface of the water 2 in the vessel 1 and forms with the water a pulp-like mixture in which the fibres are substantially uncompressed so as to be freely movable and which fills the lower part at least, of the vessel. As can be seen from FIGURE 1 the pulp is in the form of a thick circular disc having its periphery in contact with the wall of the vessel.

The vessel is then vibrated laterally and preferably from different directions either simultaneously or consecutively whilst also rotary movements are preferably imparted to it either continuously or intermittently. These movements may be restricted to the substantially horizontal direction or they may take place in three dimensions that is to say the vessel may be vibrated vertically or it may be oscillated about a horizontal axis by tilting the vessel from side to side. Thus the invention is not restricted as regards either the nature or the direction of the movements imparted to the vessel or mould. The movements thusi mparted to the vessel and to the pulp therein produces relative movements of the constituent fibres and initiates the felting action which is progressive as the operation proceeds. It is though that this migration of the fibres is due largely to the loose or thin pulp-like conditions of the material and the presence of free liquid therein and that the shaking movements produces variable currents which transport the fibres until they interlock and commence to felt together. As the operation proceeds the felting action continues so that the wool mass contracts both laterally and vertically and this is accompanied by the expulsion of water from the wool mass. Also due to the aforesaid circular movements imparted to the vessel, the wool mass may be caused to retain a circular disc shape even though its diameter is progressively reduced so that the periphery thereof recedes from the wall of the vessel. Consequently as the felting operation proceeds and the wool mass is reduced in size, the proportion of free liquid about and above the mass progressively increases.

At a suitable stage of the operation the excess water may be poured off or otherwise discharged, after which the shaking movement is continued so that further contraction of the wool mass takes place accompanied by the expulsion of additional water which is poured off from time to time. This stage is illustrated in FIGURE 2 where it can be seen the wool mass has retained a substantially circular shape, but its diameter has decreased as has its depth. The level of the water 2 has been lowered so that water is at approximately the same level as the top of the wool mass although this may be slightly lower or higher if required.

The expulsion of additional water and the development of the felting of the mass may be accelerated by subjecting the wool mass to light pressure either continuously or from time to time while it is still in the vessel and this may be accompanied for example by arranging a comparatively light pressure plate, not illustrated, above the fibrous mass in the vessel.

At a suitable stage the felt disc is removed from the vessel. If required it may still contain a substantial proportion of water when it is so removed, it being apparent that the density of the felt and the water content are determined by the nature and duration of the previous treatment. As previously stated the material may then be placed in one or more additional vessels of progressively smaller size, not illustrated, and which are similarly shaken, vibrated or otherwise actuated to continue the felting and shaping motion.

After its removal from the forming vessel, or from the last of a series thereof, the partly formed felt disc may be compressed to expel additional water therefrom after which it may be treated in any suitable way and by any appropriate apparatus, for example, in a conventional flat hardener, to develop the felt to the required hardness and density.

The operation above described may be performed more quickly than sheets of the same thickness and density are produced in the usual way, while also the wastage which occurs when discs are cut from such sheets is avoided.

Figure 3:
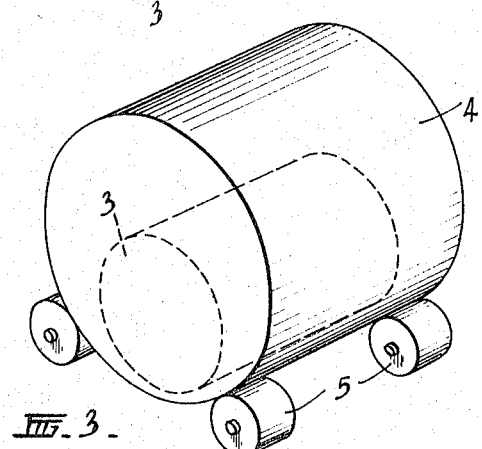
FIGURE 3 shows a modified form of vessel which may be used in the present invention.

The apparatus of FIGURE 3 may also be used to form a felt cylinder 3, the apparatus being particularly suitable when a cylinder having a relatively long axial length relative to its diameter is required.

The apparatus includes a vessel 4 which is mounted on trunnions 5. It is preferred that the trunnions be vibrated so as to transmit a movement substantially perpendicular to the axis of the vessel 4, done by some external means if necessary. As can be understood to obtain the best and most accurate felting it is desired that the movement of the vessel 4 be in all possible directions over a period of time. The simple rotational movement which would be provided by the trunnions being driven would cause felting, but such felting would not be as satisfactory as is achieved with more random movement of the mass.

Figure 4:
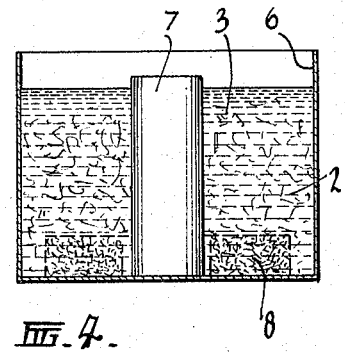
FIGURE 4 is a section through a container having a central core therein.

The apparatus illustrated in FIGURE 4 comprises a cylindrical vessel 6 which has a central core 7 therein. This core may either be fixed to the floor of the vessel or may be free to move therein. The vessel is filled with water 2 and wool 3 and initially it would assume a condition very similar to the vessel 1 illustrated in FIGURE 1. However, after the vibrational and/or rotational movement of the vessel the wool 3 reduces in size, as previously described by felting. The core 7 causes the wool mass to form as annular ring 8 and depending on the type of movement applied to the vessel 6, there will be variations in the central diameter of the ring. As illustrated it can be seen that the central diameter is shown as being larger than the core 7, but not greatly larger than the core.

If the core is free this will move with the movement of the vessel 6 and there will therefore be provided a greater central aperture than that illustrated. It can be seen that using a vessel of this type the inner area of the mass tends to felt by an amount at least similar to the amount of felting of the outer portion, which initially is pressed against the periphery of the vessel and this can be advantageous in many applications. The normal disc illustrated with relation to the earlier figures tends to be less felted near its centre than it is adjacent its periphery, because of the physical contact of the peripheral area with the walls of the vessel and its proximity to the source of movement and the greater movement of the peripheral areas.

The apparatus illustrated in FIGURES 1 and 2 and 4 is shown as having a circular vessel and produces a flat disc. In practice it is not essential that a circular vessel be used although this does, of course, have practical advantages in applying motion thereto, particularly motion due to rotation. It must be understood, however, that in practice other forms of containers could equally well be used. This would particularly be the case when the felt to be formed is to be in the form of a flat sheet, rather than a disc as would be the case if the present invention were to be applied to the manufacture of normal sheet felt which would later be hardened in a conventional flat hardening machine.

Figure 5:
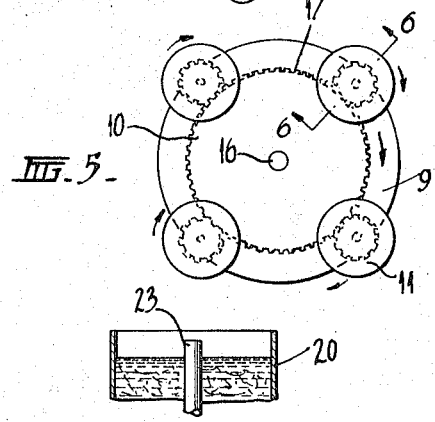
FIGURE 5 is a plan view of a particular form of apparatus wherein shaped objects can be formed.
Figure 6:
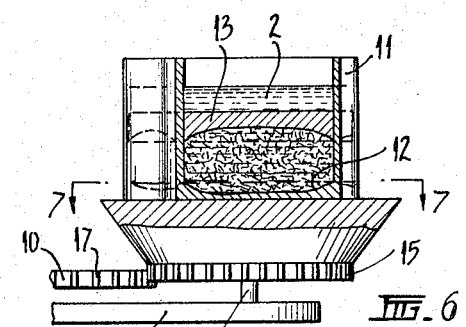
FIGURE 6 is a sectional view along line 6—6 of FIGURE 5 showing a container having a shape formed in its lower surface and a pressure member having a similar shape.
Figure 7:
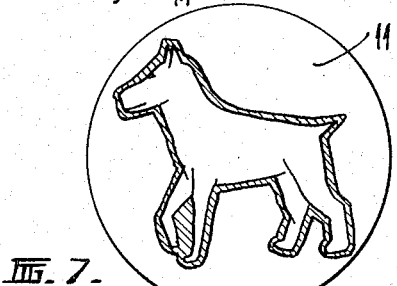
FIGURE 7 is a section along line 7—7 of FIGURE 6 showing the form of shape in the bottom of the container; and, FIGURE 8 is a sectional view showing one particular application of the present invention.

The apparatus illustrated in FIGURES 5 to 7 shows how the present invention can be used to provide shaped articles. The machine comprises a disc 9 which is adapted for rotation about a vertical axis 16. The disc drive mechanism has not been illustrated because this can be completely conventional and can be carried out in any manner known in the art. Mounted above the disc 9 is a plate 10 which is provided with peripheral gear teeth 17. Mounted on the disc 9 on spindles 14 are a plurality of vessels 11, each have a predetermined peripheral shape which closely corresponds to the article to be formed therein. The base of each of these containers is also formed so as to give the required shape of article to be formed therein.

Each vessel 11 is provided with gear teeth 15 about its lower edge which teeth are adapted to mesh with the teeth 17 on the plate 10. It can be seen that when the disc 9 is rotated the vessels 11 are not only carried with the rotation of the disc, but are also rapidly rotated about their own spindles 14 because of the meshing of the teeth 17 and 15.

Each vessel 11 is provided with a close fitting pressure plate 13 therein, which pressure plate has an internal configuration so as to provide the required shape of article in the vessel. Normally this configuration is complementary to the shaped portion 12 in the bottom of the vessel.

The operation of this form of the invention includes first filling each vessel 11 with a mixture of water 2 and wool as previously described with relation to the earlier embodiments. The pressure plate 13 is then placed in position and the disc 9 is caused to rotate. The felting action then commences in a manner similar to that described with relation to the earlier embodiments. In this case, however, the presence of the pressure plate 13 settling on the mass as it felts prevents the inward movement of the mass and holds it so that it slowly begins to occupy the whole of the shaped portion 12 of the bottom of the vessel.

As felting continues and the pressure plate 13 continues its downward movement the felting also occurs in the shaped portion of the pressure plate until, finally, the pressure plate rests on the bottom of the vessel 11, at which time the article is fully formed.

As this article is not evenly shaped and it would be difficult to harden it after felting as has been suggested in each previous embodiment, the rotation of the disc 9 is preferably maintained until the felt article has fully hardened itself. Also the amount of wool added to the vessel 11 is preferably such as to provide a relatively hard article when the pressure plate reaches the bottom of the vessel 11.

After the completion of the operation the article can be removed from the vessel and dried and any dross which may have been formed adjacent the junction of the bottom of the vessel 11 and the pressure plate 13 can be removed manually.

As with the earlier embodiments it is to be understood that the liquid 2 may be removed from the vessel during felting, although the provision of the pressure plate generally tends to separate the wool liquid mixture from the clear liquid which is left above the pressure plate.

In the illustrated machine in FIGURE 5 to FIGURE 7 we have demonstrated this embodiment of the invention as manufacturing a toy animal but it is to be understood that this particular embodiment may also be used if desired for manufacturing discs similar to those described with relation to FIGURES 1 to 4, or any other shape. If it is desired to manufacture a disc having a fine tolerance inner and outer diameter an apparatus of this type having a central core and having a pressure plate with a central aperture approximately the same diameter as the core can provide such an apertured disc in a loosely or moderately felted form.

Figure 8:
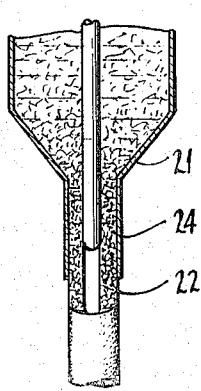

The embodiment of the invention illustrated schematically in FIGURE 8 demonstrates the formation of a continuous length of felt utilizing the present invention. This felt may have any desired cross-section, but in the illustrated embodiment of FIGURE 8 the felt is in the form of a hollow tube.

The vessel 20 has a downwardly and inwardly converging lower end 21 which leads to a discharge opening 22. As illustrated there is positioned within the vessel a central rod 23 which causes the aperture in the centre of the tube to be formed.

In use water 2 is added to the vessel 20 as is wool and the vessel is vibrated in some way as has been described with relation to the previous embodiments. As this vibraton occurs the wool moves to the tapered porton 21 of the vessel and felting occurs, as this felting takes place so does the wool move further down the converging portion 21 until it passes into the parallel side portion and, finally, is ejected through the discharge opening 22.

Whilst the felting action is taking place further wool is added to the vessel 20, together with further water if this should be necessary. As the action continues there is formed a continuous hollow tube of felt which can be made of any required length.

If required the central core 23 may be omitted to form a solid cylinder of felt and, if desired, as explained earlier the shape of aperture 22 may be any desired shape so that the material expressed therethrough assumes the shape of the aperture.

Traction may be applied to the felt as it leaves the discharge aperture 22 in order to facilitate this movement, although it must be understood that the rate of feed of felt through the discharge aperture must be limited so that the material is fully and correctly felted before it is withdrawn through the discharge opening.

If desired, the water content of the felt may be further reduced as it passes through the tube 24 before passing through the discharge aperture and this may be accomplished, for example, by heating the tube and the latter may be perforated to facilitate the discharge of steam from the felt.

Likewise, the felt may be additionally hardened as it progresses through the discharge tube 24 by imparting a rubbing action of a fluctuating pressure thereto such as by forming a section of the tube of rubber or other like resilient material and by subjecting the exterior thereof to a fluctuating pressure.

Thus, the invention permits of the formation of felt in the form of rods or cylinders of indefinite length from which discs of the required thickness may subsequently be cut either before or after the felt is hardened or densified to the required extent.

In a further embodiment of the invention, not illustrated, the invention can be used for forming small or large annular felt articles by providing a vessel or mould of an appropriate size and of annular or ring shape plan. In this way felt rings or flat endless belts of any required length, width and thickness may be formed. Among other things endless felt belts for papermaking machines may be formed in this way. Such belts which are commonly of considerable length and width could be formed in a large annular mould the rim of which when viewed in cross-section forms a continuous trough of the requisite depth and comparatively small width. Also it is not essential for this endless trough to be of circular shape in plan. If desired endless reinforcing members may be embedded in the fibre mass before the latter is felted as above described.

Rings, tubes, belts or the like formed in the aforesaid manner may subsequently be hardened in any suitable manner and preferably in the manner disclosed in the specification of co-pending application No. 425,814, filed Jan. 15, 1965, by Robert G. Tugen and George F. Flanagan, of common ownership.

According to another modification of the invention which may be particularly useful for felt moulding articles of irregular shapes, a spaced series of vertical forming vessels or moulds is arranged circumferentially near the periphery of a horizontal circular table which is rotatable about its axis.

Each mould may also be rotatable about its own axis while also provision may be made for imparting shaking or vibrating movements thereto in any required direction or directions.

I claim:
1. A method of forming felt including the steps of making a mixture of feltable fibers and a liquid within a containing vessel and subjecting the mixture to movement so the fibers progressively felt together and the fiber mass thereof contracts wherein the containing vessel has an outlet at its lower end, which outlet is initially closed, the outlet being so formed that on the fibre mass achieving the required contraction it enters the outlet, the method including the steps of adding further liquid and fibre to the containing vessel so that a continuous length of felt is formed.

2. A method according to claim 1 wherein the outlet comprises a nozzle having the required cross section and through which the formed felt passes.

3. A method according to claim 1 wherein traction is applied to the felt leaving the outlet.

4. A method according to claim 1 wherein the felt is heated at the outlet.

5. A method according to claim 1 wherein a central core is provided within the containing vessel to thereby provide a felt tube at the outlet.

6. An apparatus for forming felt comprising a plurality of moulds mounted for rotation about a substantially vertical axis on a first plate, each mould having peripheral gear teeth formed thereon, a second plate coaxial with said first plate which carries gear teeth in mesh with the teeth on the moulds and means whereby the two plates may be relatively rotated.

7. An apparatus according to claim 6 wherein each mould is provided with a pressure plate which is a slidable fit therein.

8. A method of forming felt including the steps of feeding feltable fibers and a liquid into a containing vessel to provide therein a suspension of generally randomly arranged fibres in the liquid and subjecting said suspension of fibres to motion to initially bring about generally free floating motion between the fibres of the suspension, said motion subsequently causing the fibers to contract into a felted mass.

9. A method according to claim 8 wherein the movement is produced by subjecting the vessel to movement.

10. A method of forming felt according to claim 8 wherein as the mass of fibres contracts excess liquid is removed from the containing vessel.

11. A method according to claim 8 wherein as the mass of fibres contracts it is transferred to a smaller containing vessel and the movement continued.

12. A method of forming felt according to claim 8 wherein the movement is achieved by rotation of the vessel, which is cylindrical over at least portion of its periphery, about a horizontal axis.

13. A method according to claim 12 wherein the vessel is also vibrated.

14. A method according to claim 8 wherein a core is provided within the vessel so that the shape of the felted mass is controlled both by the wall of the vessel and the core.

15. A method according to claim 14 wherein the core is fixed relative to the vessel.

16. A method according to claim 14 wherein the core is moveable relative to the vessel.

References Cited by the Examiner

UNITED STATES PATENTS

| | | | |
|---|---|---|---|
| 1,704,418 | 3/1929 | Abbott | 28—5 |
| 1,813,860 | 7/1931 | Lee | 28—14 |
| 2,478,232 | 8/1949 | Boynton | 28—72.3 |
| 2,508,968 | 5/1950 | Porritt | 28—14 |
| 2,539,573 | 1/1951 | Dokoupil | 28—5 |
| 3,003,194 | 10/1961 | Hunkeler | 264—209 X |
| 3,008,187 | 11/1961 | Slade | 264—209 X |
| 3,148,435 | 9/1964 | Tugen et al. | 28—14 |

L. K. RIMRODT, *Examiner.*

MERVIN STEIN, *Primary Examiner.*